(12) United States Patent
Cordery et al.

(10) Patent No.: US 7,552,141 B2
(45) Date of Patent: Jun. 23, 2009

(54) METHOD AND SYSTEM FOR EVALUATING OPTIONS BASED ON ONE OR MORE RATINGS ALONG ONE OR MORE DIMENSIONS

(75) Inventors: Robert A. Cordery, Danbury, CT (US); Christopher C. Lang, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 1335 days.

(21) Appl. No.: 10/649,485

(22) Filed: Aug. 27, 2003

(65) Prior Publication Data

US 2005/0049902 A1 Mar. 3, 2005

(51) Int. Cl.
G06F 17/00 (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

Primary Examiner—Isaac M Woo
(74) Attorney, Agent, or Firm—Ronald Reichamn; Angelo N. Chaclas

(57) ABSTRACT

A method and system, and computer readable medium for providing instruction for programming the system to carry out the method, for evaluating options based on ratings along various dimensions or characteristics. Type 1 databases are selected and accessed, each of the selected databases including at least one option rating, with respect to a dimension, where the option can differ among the selected databases; and selects and accesses type 2 databases each of the type 2 databases including at least one database rating for at least one of the type 1 databases. Weights are associated with the type 1 databases, the weights being calculated as a function of the database ratings. An overall rating is calculated for an option with respect to the dimension as a function of the weights and option ratings. The calculation is repeated for each remaining one of the options and a list of the options and associated overall ratings is generated. Weights are calculated as a function of the database ratings and master weights for the type 2 databases. In one embodiment of the invention the master weights are adjusted based on a user's evaluation of the list.

14 Claims, 4 Drawing Sheets

METHOD AND SYSTEM FOR EVALUATING OPTIONS BASED ON ONE OR MORE RATINGS ALONG ONE OR MORE DIMENSIONS

BACKGROUND OF THE INVENTION

The present invention relates to a method and system for evaluating options, and to a computer readable medium for programming the system in accordance with the method. More particularly it relates to evaluating options which have been rated along one or more subjective dimensions. (By "subjective dimension", sometimes hereinafter "dimension", herein is meant a characteristic of an option which can only be rated as a matter of opinion, e.g. style, or imprecisely estimated, e.g. useful life or resale value; so that the judgment and skill of the parties rating the options are important in evaluating the options.)

Often people must choose between a number of options which, in at least some respects, cannot be compared objectively. That is, the choice among the options is based, at least in part, on subjective dimensions of the options. In such cases it is desirable to make evaluations that properly account for all available information. Existing sources of such information include; periodicals published by third parties, e.g. "Consumer Reports", files of vendor supplied information, collected opinions of previous users, etc. Such sources can be maintained as local hard copy files, for scanned or manual input, or as electronic databases, maintained either on a user's system or on a network such as the Internet or a local network. (Hereinafter all such information sources are referred to as "type 1 databases". More precisely, by "type 1 databases" herein is meant any source of such information which can be accessed by the system of the present invention, either as digital files or by manual or scanned input, and which rate at least one option of interest to a user along at least one dimension of interest to the user.)

While useful, such existing sources leave the user dependent upon the objectivity and reliability of their authors and editors. Furthermore, they do not provide the user with a mechanism for combining multiple sources.

Thus it is an object of the subject invention to evaluate database ratings of a plurality of options along one or more subjective dimensions, and to combine ratings from a plurality of databases into an overall rating.

BRIEF SUMMARY OF THE INVENTION

The above object is achieved and the disadvantages of the prior art are overcome in accordance with the subject invention by a method and system for selecting and accessing type 1 databases, $DB^1_i$, each of the selected databases $DB^1_i$ including at least one option rating, $OR_i(x,n)$, for one of the options, x, with respect to a dimension n, where the option x can differ among the selected databases; and selecting and accessing type 2 databases $DB^2_j$, each of the type 2 databases $DB^2_j$ including at least one database rating $DR_j(i)$ for at least one of the databases $DB^1_i$. Weights, $W_i$ are associated with the databases $DB^1_i$, the weights $W_i$ being calculated as a function of the database ratings $DR_j(i)$; and an overall rating $R(m,n)$ is calculated for an option m with respect to the dimension n as a function of the weights $W_i$ and option ratings $OR_i(m,n)$. The calculation is repeated for each remaining one of the options for which there exists at least one option rating with respect to the dimension n; and a list of the options and associated overall ratings with respect to dimension n is generated.

In accordance with one aspect of the subject invention the function of the weights $W_i$ and the option ratings $OR_i(m,n)$ is:

$$R(m,n)=\Sigma_i(W_i \cdot \text{Norm}(OR_i(m,n))/\Sigma_i W_i;$$

where $\text{Norm}(OR_i(m,n))$ is a normalization of the option ratings $OR_i(m,n)$, and the summation ranges over all of the type 1 databases $DB^1_i$ for which the option ratings $OR_i(m,n)$ are defined.

In accordance with another aspect of the subject invention the option ratings $OR_i(m,n)$ are normalized with respect to a maximum rating $OR_i(\max)$ and a minimum satisfactory rating $OR_i(\text{sat})$ for each of the selected type 1 databases $DB^1_i$.

In accordance with another aspect of the subject invention, if the option rating $OR_i(m,n)$ is less than the minimum satisfactory rating, $OR_i(\text{sat})$, the normalization, $\text{Norm}(OR_i(m,n))$ is set equal to a predetermined value; the predetermined value being less than the normalized minimum satisfactory value.

In accordance with another aspect of the subject invention the function of the database ratings $DR_j(i)$ is:

$$W_i=\Sigma_j(MW_j \cdot \text{Norm}(DR_j(i))/\Sigma j MW_j;$$

where $\text{Norm}(DR_j(i))$ is a normalization of the database ratings $DR_j(i)$, and the summation ranges over all of the type 2 databases $DB^2_j$ for which the option ratings $DR_j(i)$ are defined, and the $MW_j$ are master weights associated with the type 2 databases $DB^2_j$.

In accordance with another aspect of the subject invention the database ratings $DR^2_j$ are normalized with respect to a maximum rating $DR_j(\max)$ and a minimum satisfactory rating $DR_j(\text{sat})$ for each of the selected type 2 databases $DB^2_j$.

In accordance with still another aspect of the subject invention the master weights $MW_j$ are adjusted based on a user's evaluation of the list.

In accordance with another aspect of the subject invention adjustment of the master weights $MW_j$ includes a user identifying a selected choice m'; and calculating a partial derivative $P(MW_j')=\partial F(m',n)/\partial MW_j'$; where $F(m',n)$ is the deviation of option rating $R(m',n)$ from the mean rating, $\Sigma_m R(m,n)/M$ as a function of master weights $MW_j$, where M is the total number of options. $MW_j'$ is then set equal to $MW_j'(1+\alpha P(MW_j'))$, where $\alpha$ is a small positive constant, and the process is repeated for all remaining master weights $MW_j$.

In accordance with still another aspect of the subject invention the options are rated with respect to a plurality of dimensions.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
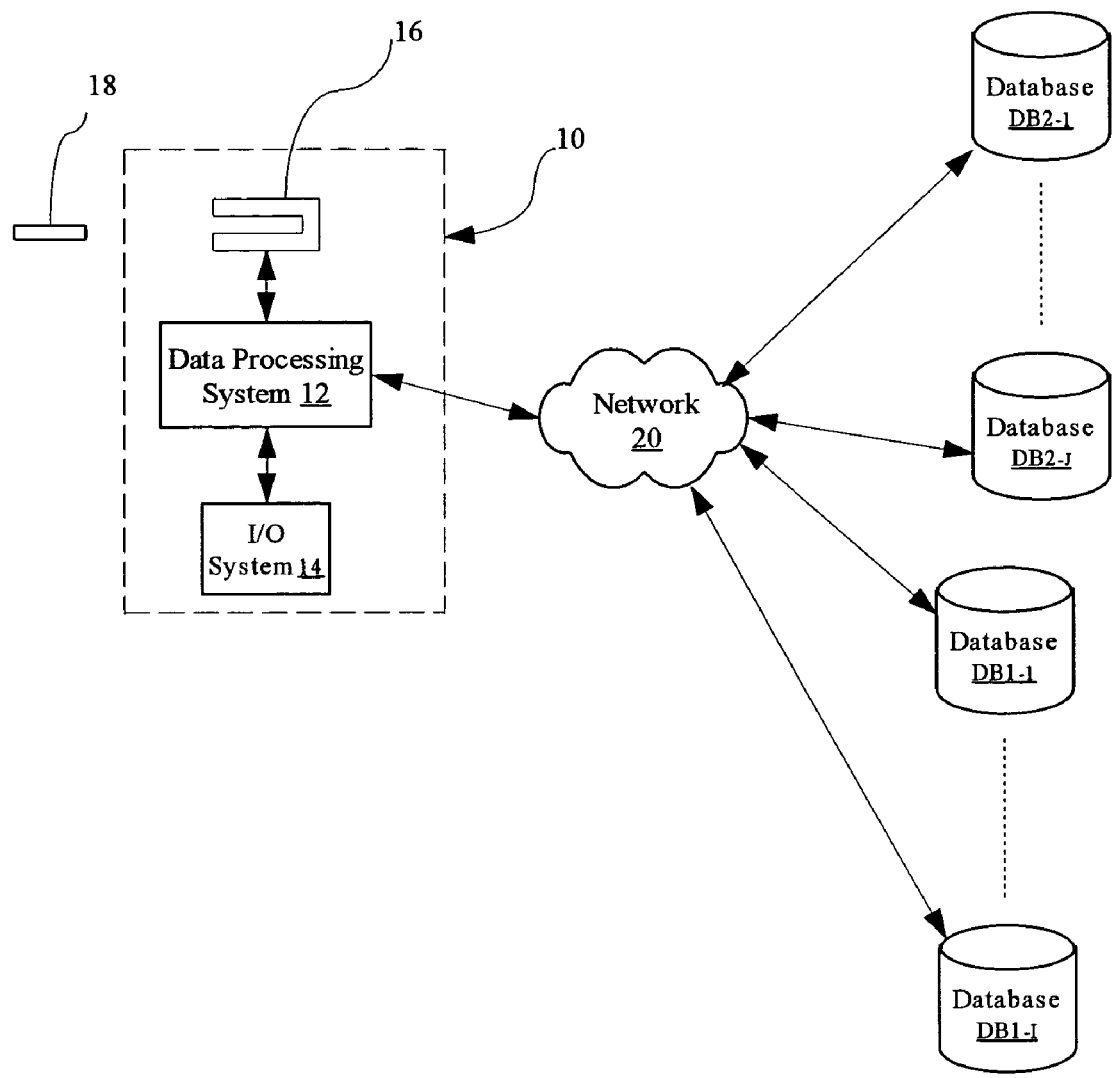
FIG. 1 shows a schematic block diagram of a system in accordance with the present invention and an associated network and databases.

FIG. 1 shows system 10 in accordance with the present invention. System 10 communicates with type 1 databases $DB^1_1$ through $DB^1_I$ and type 2 Databases $DB^2_1$ through $DB^2_J$ through network 20 in any convenient manner. Network 20 can be a network such as the Internet, or a local area network, or a public switched network, or any other convenient mechanism for communicating with a plurality of databases which can be located in various places and maintained by various parties. In other embodiments of the present invention, some, or all, of databases $DB^1$ and $DB^2$ can be maintained locally on system 10.

System 10 includes data processing system 12, which is preferably a conventional digital computer, input/out system 14, through which a system user interacts with system 12, and disk reader 16 for reading portable magnetic disk 18. Input/output system can include a printer or visual display, or any other convenient mechanism for output of lists of options with associate ratings in accordance with the present invention. In other embodiments of the present invention input/output system 14 can include a keyboard or scanner for input of data from databases maintained as hard copy.

In the embodiment of FIG. 1 system 12 is programmed to carry out the method of the present invention by instructions provided by portable magnetic disk 18 and disk drive 16. In other embodiments of the present invention any other convenient computer readable medium can be used to provide instructions to system 12. The term "computer-readable medium" as used herein refers to any medium that participates in providing instructions to system 12 for execution. Such a medium may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Type 1 databases $DB^1_i$ contain ratings for various types of options. For example databases $DB^1_i$ can contain ratings for consumer products, industrial products, professional services such as doctors, accountants, etc., institutions such as hospitals or schools, and in general options for any choice or situation with which a user may be faced. Each option is rated along one or more dimensions, i.e. characteristics of interest,. For example, consumer products can be rated for value, durability, service/warranty, overall quality, and style. Databases $DB^1_i$ can also report objective information such as price. Note that every database $DB^1_i$ need not contain ratings for every option, nor rate every option along every dimension.

Type 2 databases $DB^2_j$ contain ratings of the relative quality of type 1 databases $DB^1_i$. Again note that each database $DB^1_i$ need not be rated by every database $DB^2_j$. Preferably such ratings will reflect the experiences of other users with various type 1 databases $DB^1_i$ and the value placed on them but they can also be based on more or less abstract evaluations of databases $DB^1_i$ by third parties. Determination of such values can be based on, at least in part, the monitored interaction history between a user and a particular database $DB^1_x$. Factors in this history which are considered in various embodiments of the present invention can include: how many times the user accesses database $DB^1_x$, what search queries where used to identify database $DB^1_x$, whether a purchase was made as a result of accessing database $DB^1_x$, whether database $DB^1_x$ was "bookmarked", as well as other factors which will become apparent to those skilled in the art from consideration of the present disclosure. A user can also provide an express value for database $DB^1_x$. These factors are then combined to obtain a value, i.e. rating. In a preferred embodiment the factors are combined as a weighted sum.

At present no optimal method for combining factors is believed to be known. However it should be understood that the present invention will be useful (in the sense that relatively highly valued sources will be more likely to be useful than randomly chosen sources) if any reasonable method is used to obtain the values; e.g. any method which reflects that, other things being equal, that an information source demonstrates more value the more often it is accessed; that bookmarked sources demonstrate more value than sources which are not bookmarked; etc. Thus all such reasonable methods for combining factors to obtain values are within the contemplation of the present invention.

Figure 2A:
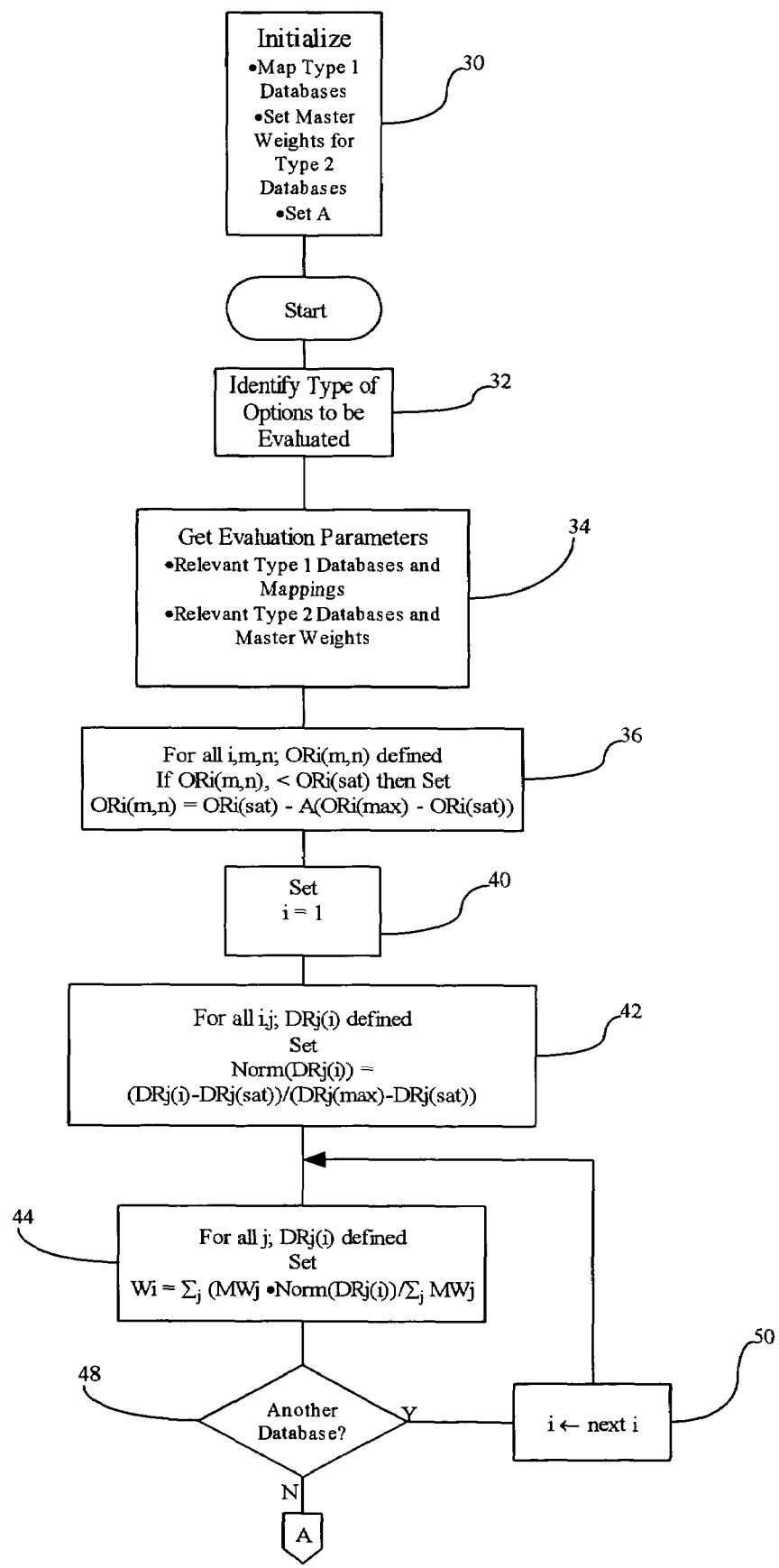
FIGS. 2A and 2B show a flow diagram of the operation of the system of FIG. 1 in accordance with the present invention.
Figure 2B:
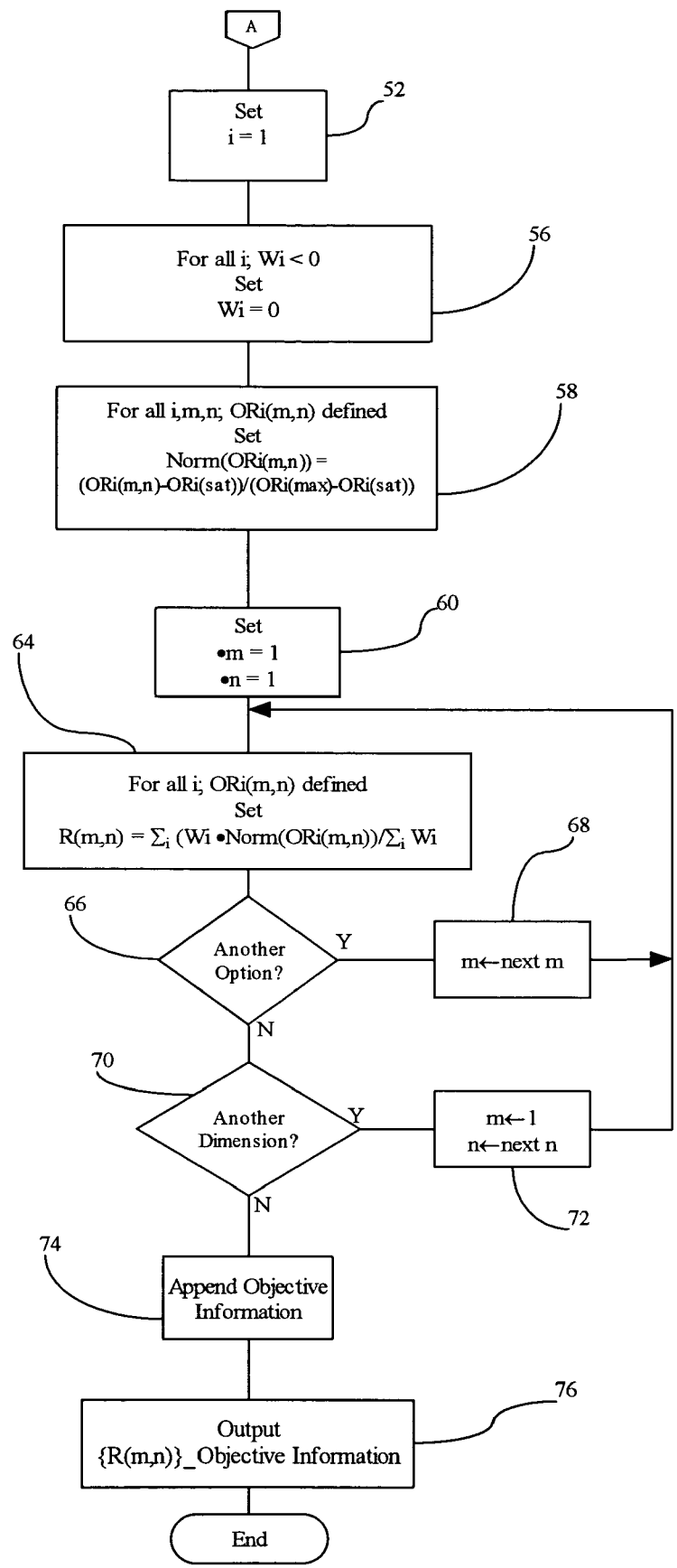

FIGS. 2A and 2B show a flow diagram of the operation of system 10 in accordance with the method of the present invention. At initial step 30 system 10 maps records in type 1 databases $DB^1_i$ into predetermined formats for different types of options, and determines master weights $MW_j$ for corresponding type 2 databases $DB^2_j$. Since databases $DB^1_i$ are maintained by various third parties they are mapped into predetermined formats so that ratings having different structures can be compared. For example similar dimensions of options may be described differently in different databases, e.g. reliability may be described in terms of mean time between failures, maintenance costs, durability, or expected useful life. Development of maps for various types of options and databases is well within the ability of those skilled in the art and need not be discussed further here for an understanding of the subject invention. Of course, in embodiments of the invention where databases are maintained to a uniform standard no mapping is necessary. Since, in the preferred embodiment described, database ratings $DR_j(i)$ are uniformly identified by indices i, j and expressed as an increasing scalar value no mappings of type 2 databases $DB^2_j$ are required. Note, however, that ratings $DR_j(i)$ may differ for different types of options, e.g. database $DB^2_j$ may rate database $DB^1_i$ differently for choosing among makes of cars and various hospitals. Master weights $MW_j$ are set by a system user to express the user's confidence in corresponding type 2 databases. At step 30 system 10 also gets parameter A which is a constant set by a user to reflect the importance that any chosen option of the selected type be rated as at least minimally satisfactory by all databases $DB^1_i$, as will be described further below.

After initialization, at step 32 system 10 determines the type of options to be evaluated and at step 34 gets the relevant type 1 databases $DB^1_i$ and associated mappings, minimum satisfactory ratings $OR_i(sat)$, and maximum ratings $OR_i$ (max), and relevant type 2 databases $DB^2_j$ and associated master weights $MW_j$, minimum satisfactory ratings $DR_j(sat)$, and maximum rating $DR_j(max)$. Relevant databases $DB^1_i$ are databases which include at least one option rating $OR_i(m,n)$ for a selected option m along a dimension of interest n. Relevant databases $DB^2_j$ include at least one database rating $DR_j(i)$ of a relevant database $DB^1_i$.

At step 36 all option values $OR_i(m,n)$ which are defined in relevant databases $DB^1_i$, for selected types of options m, along dimensions of interest are tested to determine if, $$OR_i(m,n)<OR_i(sat);$$

if so system 10 sets:

$$OR_i(m,n)=OR_i(sat)-A(OR_i(max)-OR_i(sat)) \quad (1)$$

At step 40 index i is set equal to 1.

At step 42, for all i,j, $DR_j(i)$ defined, system 10 sets:

$$Norm(DR_j(i))=(DR_j(i)-DR_j(sat))/(DR_j(max)-DR_j(sat)) \quad (2)$$

At step 44. for all j, $DR_j(i)$ defined, system 10 sets weights $W_i$ for databases $DB^1_i$:

$$W_i=\Sigma_j(MW_j \cdot Norm(DR_j(i)))/(\Sigma_j MW_j); \quad (3)$$

and continues to loop through steps 48 and 50 until all values for $W_i$ are calculated.

(Note that though weights $W_i$ have been described for entire databases $DB^1_i$, distinct weights along each dimension can be obtained without departing from the disclosure of the present invention by partitioning databases $DB^1_i$ into separate databases along each dimension.)

At step 52, shown in FIG. 2B, index i is set equal to 1, and at step 56 for all i, $W_i<0$, system 10 sets $W_i=0$ to avoid a possible false choice based on the product of a negative $W_i$ times a large $Norm(OR_i(m,n))$.

At step 58 all i,m,n $OR_i(m,n)$ defined, system 10 sets:

$$Norm(OR_i(m,n))=(OR_i(m,n)-OR_i(sat))/(OR_i(max)-OR_i(sat)) \text{ (Note that by (1) } Norm(OR_i(m,n))=-A \text{ if } OR_i(m,n)<OR_i(sat).) \quad (4)$$

At step 64. for all i, $OR_i(m,n)$ defined, system 10 sets overall rating R(m,n) for option m along dimension n:

$$R(m,n)=\Sigma_i(W_i \cdot Norm(OR_i(m,n)))/(\Sigma_i W_i); \quad (5)$$

and continues through inner loop steps 66 and 68 and outer loop steps 70 and 72 until all values for R(m,n) are calculated.

At step 74 objective information of interest such as price is appended to ratings R(m,n) and at step 76 a list of ratings with any objective information is output and system 10 exits.

Though various elements have been shown as physically distinct structures in FIG. 1 for purposes of clarity, those skilled in the art will recognize that the functions of these elements can be carried out by a single system or the like. Particularly, though databases $DB^1_i$ and $DB^2_j$ have been shown, and will be described below, as distinct structures for reasons of clarity, the information contained in these databases can be stored in a single database on a single storage device. Accordingly, reference herein to particular databases is not to be understood as being limited to distinct or separate data structures, but as used herein includes any form of data organization whereby the identified information items can be accessed as a group.

EXAMPLE

TABLE 1

[A = 0.5]

| Optons/Dimensions | Value | Durability | Serv/Warranty | Overall Quality | Style | Price($) |
|---|---|---|---|---|---|---|
| $DB^1_1$: $OR_1(max) = 100$, $OR_1(sat) = 0$ | | | | | | |
| Brand #1 | 69 | 64 | 0 | 86 | — | 78.99 |
| Brand #2 | 74 | 83 | 0 | 56 | — | 34.99 |
| Brand #3 | 78 | 86 | 70 | 68 | — | 67.99 |
| Brand #4 | — | — | — | — | — | — |
| $DB^1_2$: $OR_2(max) = 10$, $OR_2(sat) = 8$ | | | | | | |
| Brand #1 | — | — | — | — | 9 | — |
| Brand #2 | — | — | — | — | — | — |
| Brand #3 | — | — | — | — | -3 | — |
| Brand #4 | — | — | — | — | — | — |
| $DB^1_3$: $OR_3(max) = 1$, $OR_3(sat) = 0$ | | | | | | |
| Brand #1 | -0.12 | 0.21 | 0 | 0.79 | — | 78.99 |
| Brand #2 | 0.57 | 0.45 | 0 | 0.07 | — | 34.99 |
| Brand #3 | — | — | — | — | — | — |
| Brand #4 | 0.78 | 0.42 | 0 | 0.05 | — | 19.99 |
| $DB^1_4$ $OR_4(max) = 100$, $OR_4(sat) = 50$ | | | | | | |
| Brand #1 | 75 | — | — | 86 | 92 | 63.00 |
| Brand #2 | 97 | — | — | 86 | 85 | 34.99 |
| Brand #3 | 84 | — | — | 88 | 87 | 19.99 |
| Brand #4 | — | — | — | — | — | — |

TABLE 2

|        | $MW_j$ | $DR_j(max)$ | $DR_j(sat)$ | $DB^1_1$ | $DB^1_2$ | $DB^1_3$ | $DB^1_4$ |
|--------|--------|-------------|-------------|----------|----------|----------|----------|
| DB2-1  | 3      | 100         | 0           | 56       | 78       | 33       | 91       |
| DB2-2  | 10     | 10          | 5           | 7.93     | 4.04     | 1.46     | 9.38     |
| DB2-3  | 0.7    | 1           | 0           | 0.52     | —        | 0.03     | —        |

TABLE 3

Overall Rating

| Optons/Dimensions | Value | Durability | Serv/Warranty | Overall Quality | Style | Price ($) |
|-------------------|-------|------------|---------------|-----------------|-------|-----------|
| Brand #1 | 0.58 (N = 2) | 0.64 (N = 1) | 0.00 (N = 1) | 0.78 (N = 2) | 0.84 (N = 2) | [63.00 – 78.99] |
| Brand #2 | 0.87 (N = 2) | 0.83 (N = 1) | 0.00 (N = 1) | 0.66 (N = 2) | 0.70 (N = 1) | 34.99 |
| Brand #3 | 0.72 (N = 2) | 0.86 (N = 1) | 0.70 (N = 1) | 0.73 (N = 2) | 0.74 (N = 2) | 67.98 |
| Brand #4 | ? | ? | ? | ? | ? | ? |

A user wishes to choose among four brands of consumer products, i.e. options, which are rated by four type 1 databases $DB^1_1$ through $DB^1_4$, as shown in Table 1. The type 1 databases are rated by three type 2 databases $DB^2_1$ through $DB^2_3$ as shown in Table 2. From (2) and (3) and Table 2:

$$W1 = (3(56-0)/(100-0)) + 10(7.93-5)/(10-5)) +$$
$$0.7(0.52-0)/(1-0))/(3+10+0.7)$$
$$= (1.68 + 5.86 + 0.36)/13.7$$
$$\approx 0.58$$
$$W2 = (3(78-0)/(100-0) + 10(4.04-5)/(10-5))/(1-0))/(3+10)$$
$$= (2.34 - 1.92 + 0.021)/13$$
$$\approx 0.03$$
$$W3 = (3(33-0)/(100-0) + 10(1.46-5)/(10-5) + 0.7(0.03-0)/(1-0))$$
$$= (0.99 - 7.08 + 0.021)/13.7$$
$$\approx -6.0, \text{ which, by step 56 in } Fig. \text{ 2B, is set } = 0.$$
$$W4 = (3(91-0)/(100-0) + 10(9.38-5)/(10-5))/(3+13)$$
$$= (2.73 + 8.76)/13$$
$$\approx 0.88$$

From (4) and (5) and Table 1 the overall rating for Brand 1 along the value dimension, R(1,1), is:

$$R(1,1)=(0.58(69-0)/(100-0)+0(-0.5)+0.88(75-50)/$$
$$(100-50))/(0.58+0+0.88)=(0.40+0+0.44)/$$
$$(1.46)\approx 0.58 \text{ (Note that, by step 36 in FIG. 2A}$$

and step 58 in FIG. 2B, −A=−0.5 is substituted for the less than satisfactory option rating Norm($OR_3$(1,1)).)

Similar results are obtained for other overall values and set forth in Table 3, where N is the number of type 1 databases $DB^1_i$ contributing to the overall rating. Note no overall ratings where obtained for brand 4 since it was rated only by $DB^1_3$ and weight $W_3$=0. Also note that a range of objective information is reported for the brand 1 price, reflecting the different information from different databases.

Figure 3:
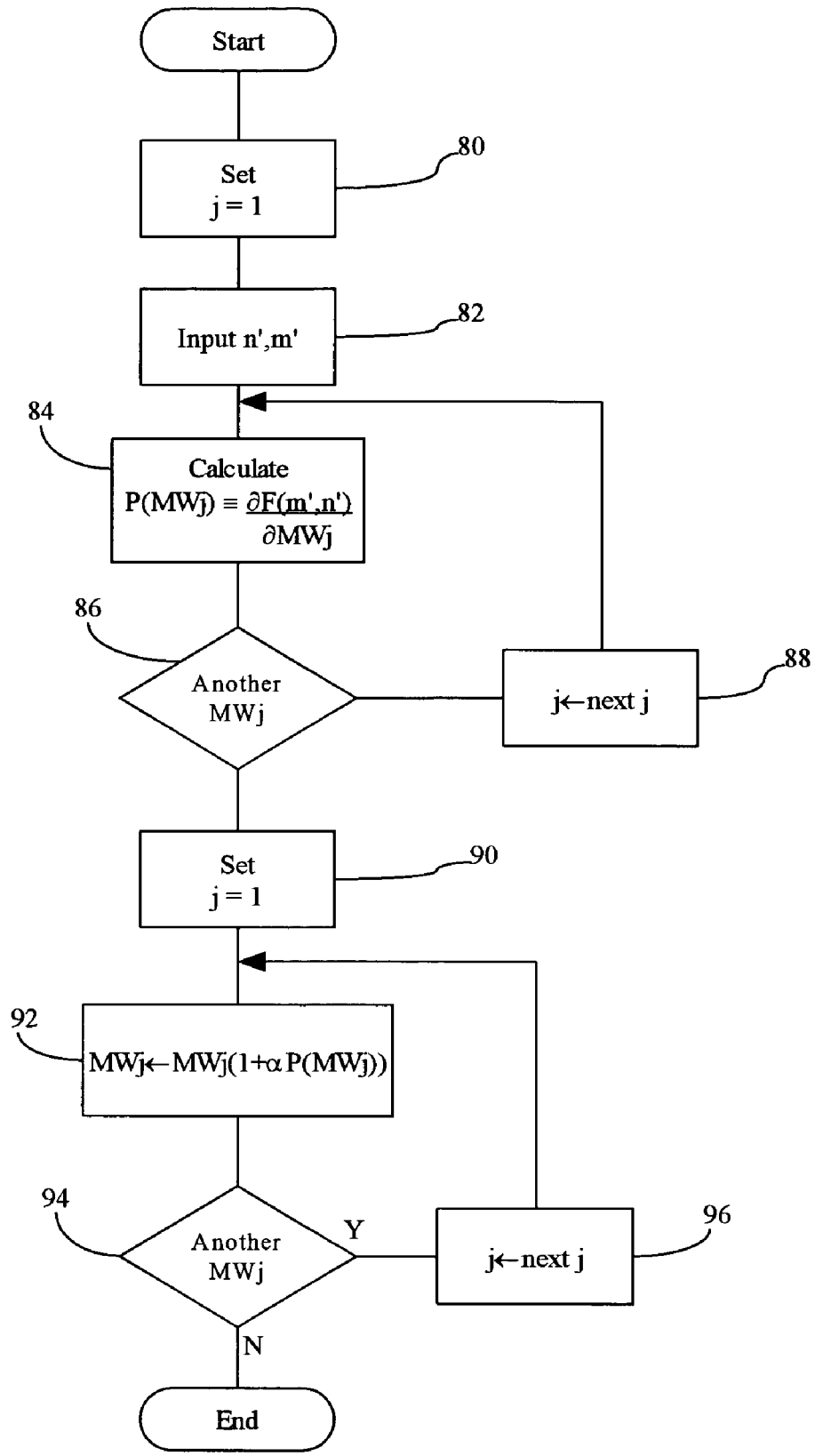
FIG. 3 shows a flow diagram of the operation of the system of FIG. 1 in accordance with one aspect of the present invention.

FIG. 3 shows a flow diagram of the operation of system 10 in accordance with an aspect of the present invention where master weights $MW_j$ are adjusted based upon a user's evaluation of a list of overall results. In a preferred embodiment, at step 80 system 10 sets j equal to 1. At step 82 a user inputs m' and n' where m' is the option selected after considering the output list and n' is a critical dimension such as the dimension which the user considers as most important in making the choice. At step 84 system 10 calculates P($MW_j'$), where P($MW_j'$) is the partial derivative of a function Fm',n'($MW_j$), which is defined as the deviation of the overall rating R(m',n') from the mean of the overall ratings R(m,n') along critical dimension n', as a function of all master ratings $MW_j$, for all databases $DB^2_j$ for which R(m'n') is defined. System 10 then loops through steps 86 and 88 until all partial derivatives have been determined. At step 90 j is reset to 1 and at step 92 master weight $MW_j$ is adjusted by a factor, (1+αP($MW_j$)), where α is a small positive number for which an appropriate value can easily be determined by experimentation. System 10 then loops through steps 94 and 96 until all values for $MW_j$ have been adjusted.

In another embodiment of the invention Fm',n'($MW_j$), is defined as the deviation of the overall rating R(m',n') from the maximum of the overall ratings R(m,n') along critical dimension n', as a function of all master ratings $MW_j$, for all databases $DB^2_j$ for which R(m'n') is defined and system 10 proceeds as shown in FIG. 3. This embodiment addresses the needs of a user who interested in how an option compares to the best of the other choices rather than to the average, Other techniques for adjusting master weights $MW_j$ will be readily apparent to those skilled in the control systems art and all such techniques are within the contemplation of the present invention.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for evaluating a plurality of options comprising the steps of:
   a) selecting and accessing type 1 databases, $DB^1_i$, each of said selected databases $DB^1_i$ including at least one option rating, $OR_i(x,n)$, for one of said options, x, with respect to a dimension n, where said option x can differ among said selected databases;
   b) selecting and accessing type 2 databases $DB^2_j$, each of said type 2 databases $DB^2_j$ including at least one database rating $DR_j(i)$ for at least one of said databases $DB^1_i$;

c) associating weights, $W_i$ with said databases $DB^1_i$, said weights $W_i$ being calculated as a function of said database ratings $DR_j(i)$; and d) calculating an overall rating $R(m,n)$ for an option m with respect to said dimension n as a function of said weights $W_i$ and option ratings $OR_i(m,n)$;

e) repeating step d for each remaining one of said options for which there exists at least one option rating with respect to said dimension n; and f) generating a list of said options and associated overall ratings with respect to dimension n.

2. A method as described in claim 1 where said function of said weights $W_i$ and said option ratings $OR_i(m,n)$ is:

$$R(m,n)=\Sigma_i(W_i \cdot \mathrm{Norm}(OR_i(m,n)))/\Sigma_i W_i;$$

a) where $\mathrm{Norm}(OR_i(m,n))$ is a normalization of said option ratings $OR_i(m,n)$, and b) summation $\Sigma_i$ ranges over all of said type 1 databases $DB^1_i$ for which said option ratings $OR_i(m,n)$ are defined.

3. A method as described in claim 2 where said option ratings $OR_i(m,n)$ are normalized with respect to a maximum rating $OR_i(\max)$ and a minimum satisfactory rating $OR_i(\mathrm{sat})$ for each of said selected type 1 databases $DB^1_i$.

4. A method as described in claim 2 where, if said option rating $OR_i(m,n)$ is less than said minimum satisfactory $OR_i(\mathrm{sat})$, said normalization, $\mathrm{Norm}(OR_i(m,n))$ is set equal to a predetermined value; said predetermined value being less than a normalized minimum satisfactory rating $\mathrm{Norm}(OR_i(\mathrm{sat}))$.

5. A method as described in claim 2 where said function of said database ratings $DR_j(i)$ is:

$$W_i=\Sigma_j(MW_j \cdot \mathrm{Norm}(DR_j(i)))/\Sigma_j MW_j;$$

a) where $\mathrm{Norm}(DR_j(i))$ is a normalization of said database ratings $DR_j(i)$, and b) summation $\Sigma_j$ ranges over all of said type 2 databases $DB^2_j$ for which said option ratings $DR_j(i)$ are defined; and c) $MW_j$ are master weights associated with said type 2 databases $DB^2_j$.

6. A method as described in claim 5 where said database ratings $DR^2_j$ are normalized with respect to a maximum rating $DR_j(\max)$ and a minimum satisfactory rating $DR_j(\mathrm{sat})$ for each of said selected type 2 databases $DB^2_j$.

7. A method as described in claim 6 where, if one of said weights $W_i$ is less than 0, said one weight is set equal to 0.

8. A method as described in claim 5 further comprising the step of adjusting said master weights $MW_j$ based on a user's evaluation of said list.

9. A method as described in claim 8 where said adjusting step comprises the steps of:

a) said user identifying a selected choice m';

b) calculating a partial derivative $P(MW_j')=\partial Fm',n'(MW_j)/\partial MW_j'$; where $Fm'n'(MWj)$ is the deviation of option rating $R(m',n)$ from the mean rating, $\Sigma_m R(m,n)/M$ as a function of master weights $MW_j$, where M is the total number of options for which $R(m,n')$ is defined;

c) setting $MW_j'=MW_j'(1+\alpha P(MW_j'))$, where $\alpha$ is a small positive number; and d) repeating steps b and c for all remaining master weights $MW_j$.

10. A method as described in claim 8 where said adjusting step comprises the steps of:

a) said user identifying a selected choice m';

b) calculating a partial derivative $P(MW_j')=\partial Fm',n'(MW_j)/\partial MW_j'$; where $Fm'n'(MW_j)$ is the deviation of option rating $R(m',n)$ from the maximum rating, $\max(R(m,n))$ as a function of master weights $MW_j$;

c) setting $MW_j'=MW_j'(1+\alpha P(MW_j'))$, where $\alpha$ is a small positive number; and d) repeating steps b and c for all remaining master weights $MW_j$.

11. A method as described in claim 1 where said options are rated with respect to a plurality of dimensions, comprising the further step of repeating steps d and e for each remaining one of said dimensions.

12. A method as described in claim 11 further comprising the step of adjusting said master weights $MW_j$ based on a user's evaluation of said list.

13. A method as described in claim 12 where said adjusting step comprises the steps of:

a) said user identifying a selected choice m' and a critical dimension n';

b) calculating a partial derivative $P(MW_j')=\partial Fm',n'(MW_j)/\partial MW_j'$; where $Fm',n'(MW_j)$ is the deviation of option rating $R(m',n')$ from the mean rating, $\Sigma_m R(m,n')/M$, along said critical dimension n', as a function of master weights $MW_j$, where M is the total number of options for which $R(m,n')$ is defined;

c) setting $MW_j'=MW_j'(1+\alpha P(MW_j'))$, where $\alpha$ is a small positive number; and d) repeating steps b and c for all remaining master weights $MW_j$.

14. A method as described in claim 12 where said adjusting step comprises the steps of:

a) said user identifying a selected choice m';

b) calculating a partial derivative $P(MW_j')=\partial Fm',n'(MW_j)/\partial MW_j'$; where $Fm'n'(MW_j)$ is the deviation of option rating $R(m',n)$ from the maximum rating, $\max(R(m,n))$ as a function of master weights $MW_j$;

c) setting $MW_j'=MW_j'(1+\alpha P(MW_j'))$, where $\alpha$ is a small positive number; and d) repeating steps b and c for all remaining master weights $MW_j$.

* * * * *